United States Patent
Marvin et al.

(10) Patent No.: US 11,489,377 B2
(45) Date of Patent: Nov. 1, 2022

(54) ROTARY ELECTRIC MACHINE HAVING WINDING COILS WITH FIRST AND SECOND PORTIONS CONNECTED IN SERIES

(71) Applicant: KOCH ENGINEERED SOLUTIONS, LLC, Wichita, KS (US)

(72) Inventors: Russel Hugh Marvin, Potsdam, NY (US); Dylan Broomfield, Gansevoort, NY (US)

(73) Assignee: LC ADVANCED MOTOR TECHNOLOGY CORPORATION, New York, NY (US)

( * ) Notice: Subject to any disclaimer, the term of this patent is extended or adjusted under 35 U.S.C. 154(b) by 217 days.

(21) Appl. No.: 16/710,171

(22) Filed: Dec. 11, 2019

(65) Prior Publication Data

US 2021/0184516 A1 Jun. 17, 2021

(51) Int. Cl.
| H02K 1/16 | (2006.01) |
| H02K 3/14 | (2006.01) |
| H02K 1/18 | (2006.01) |
| H02K 21/14 | (2006.01) |

(52) U.S. Cl.
CPC .............. *H02K 1/165* (2013.01); *H02K 1/185* (2013.01); *H02K 3/14* (2013.01); *H02K 21/14* (2013.01)

(58) Field of Classification Search
CPC ............ H02K 1/16; H02K 1/165; H02K 1/18; H02K 1/185; H02K 3/14; H02K 21/14
USPC .................................................. 310/179, 180
See application file for complete search history.

(56) References Cited

U.S. PATENT DOCUMENTS

| 2002/0163275 | A1 | 11/2002 | Hsu | |
| 2005/0258703 | A1 | 11/2005 | Kouda et al. | |
| 2006/0066167 | A1* | 3/2006 | Saito | B60L 50/15 |
| | | | | 310/201 |
| 2010/0289374 | A1* | 11/2010 | Koga | H02K 15/0421 |
| | | | | 310/195 |
| 2011/0198962 | A1 | 8/2011 | Tang | |
| 2011/0248509 | A1 | 10/2011 | Snitchler et al. | |
| 2012/0119609 | A1 | 5/2012 | Janecek | |

(Continued)

OTHER PUBLICATIONS

International Patent Application No. PCT/US2020/060164 International Search Report and Written Opinion dated Feb. 5, 2021.

*Primary Examiner* — Rashad H Johnson
(74) *Attorney, Agent, or Firm* — Bochner IP, PLLC; Andrew D. Bochner

(57) ABSTRACT

A rotary electric machine includes a stator extending along an axis and having teeth arranged about the axis. The teeth are circumferentially spaced apart by slots. Winding coils extend around the teeth and through the slots. The winding coils are electrically connected to one another to form phases. At least one of the winding coils has a first portion extending through first and second slots of the slots and including first end turns extending between the first and second slots over an axial end surface of the teeth. A second portion extends through the first and second slots and includes second end turns extending between the first and second slots over the axial end surface of the teeth. The first and second portions are connected in series at a third end turn spaced closer to the axial end surface than either the first or second end turns.

20 Claims, 7 Drawing Sheets

(56) References Cited

U.S. PATENT DOCUMENTS

| | | | | |
|---|---|---|---|---|
| 2013/0009509 A1* | 1/2013 | Tsuge | .................. | H02K 15/045 |
| | | | | 310/201 |
| 2013/0285502 A1* | 10/2013 | Clark | .................. | H02K 15/063 |
| | | | | 310/208 |
| 2014/0300220 A1* | 10/2014 | Marvin | .................... | H02K 3/24 |
| | | | | 310/54 |
| 2018/0166939 A1* | 6/2018 | Hirao | ....................... | H02K 3/04 |
| 2018/0342918 A1* | 11/2018 | Hino | ....................... | H02K 3/12 |

\* cited by examiner

ROTARY ELECTRIC MACHINE HAVING WINDING COILS WITH FIRST AND SECOND PORTIONS CONNECTED IN SERIES

TECHNICAL FIELD

The present invention relates generally to rotary electric machines, and specifically to a winding configuration for rotary electric machines.

BACKGROUND

All electric motors and generators, i.e., rotary electric machines, generate heat during operation. The heat can be removed using a fluid such as air or a liquid. In some examples, the cooling structure is provided in the slot to provide more direct contact with the winding coils and thereby more effectively remove heat generated therefrom. With this in mind, it is desirable to interconnect the winding coils in a manner that minimizes electrical and/or thermal resistance therethrough.

SUMMARY

In one example, a rotary electric machine includes a stator extending along an axis and having teeth arranged about the axis. The teeth are circumferentially spaced apart by slots. Winding coils extend around the teeth and through the slots. The winding coils are electrically connected to one another to form phases. At least one of the winding coils has a first portion extending through first and second slots of the slots and including first end turns extending between the first and second slots over an axial end surface of the teeth. A second portion extends through the first and second slots and includes second end turns extending between the first and second slots over the axial end surface of the teeth. The first and second portions are connected in series at a joint on an end turn spaced an axial distance closer to the axial end surface than either the first or second end turns.

In another example, a winding coil is provided for a rotary electric machine having a stator extending along an axis and having teeth arranged about the axis. The teeth are circumferentially spaced apart by slots. The winding coil has a first portion for extending through first and second slots of the slots and including first end turns extending between the first and second slots over an axial end surface of the teeth. A second portion is provided for extending through the first and second slots and includes second end turns extending between the first and second slots over the axial end surface of the teeth. The first and second portions are connected in series at a joint on an end turn spaced an axial distance closer to the axial end surface than either the first or second end turns.

In another example, a rotary electric machine includes a stator extending along an axis and having teeth arranged about the axis. The teeth are circumferentially spaced apart by slots. Winding coils extend around the teeth and through the slots. The winding coils are electrically connected to one another to form phases. Each winding coil includes first and second form-wound diamond coil portions connected end-to-end in series with one another. Each slot receives a pair of first portions and a pair of second portions.

In another example, a rotary electric machine includes a stator extending along an axis and having teeth arranged about the axis. The teeth are circumferentially spaced apart by slots. First and second winding coils extend around the teeth and through the slots. The first and second winding coils are electrically connected to one another to form phases. The first and second winding coils extends through first and second slots of the slots such that successive turns of the first winding coil in the first slot are wound in a first radial direction and successive turns of the second winding coil in the first slot are wound in a second radial direction opposite the first radial direction.

In another example, a rotary electric machine includes a stator extending along an axis and having teeth arranged about the axis. The teeth are circumferentially spaced apart by slots. Winding coils extend around the teeth and through the slots. The winding coils are electrically connected to one another to form phases. At least one of the winding coils has a first portion extending through first and second slots of the slots and first end turns extending between the first and second slots over an axial end surface of the teeth. A second portion extends through the first and second slots and includes second end turns extending between the first and second slots over the axial end surface of the teeth. The first and second portions are connected in series. In the first slot successive turns of the first portion are wound in a first radial direction and successive turns of the second portion are wound in a second radial direction opposite the first radial direction.

Other objects and advantages and a fuller understanding of the invention will be had from the following detailed description and the accompanying drawings.

DETAILED DESCRIPTION

Figure 1:
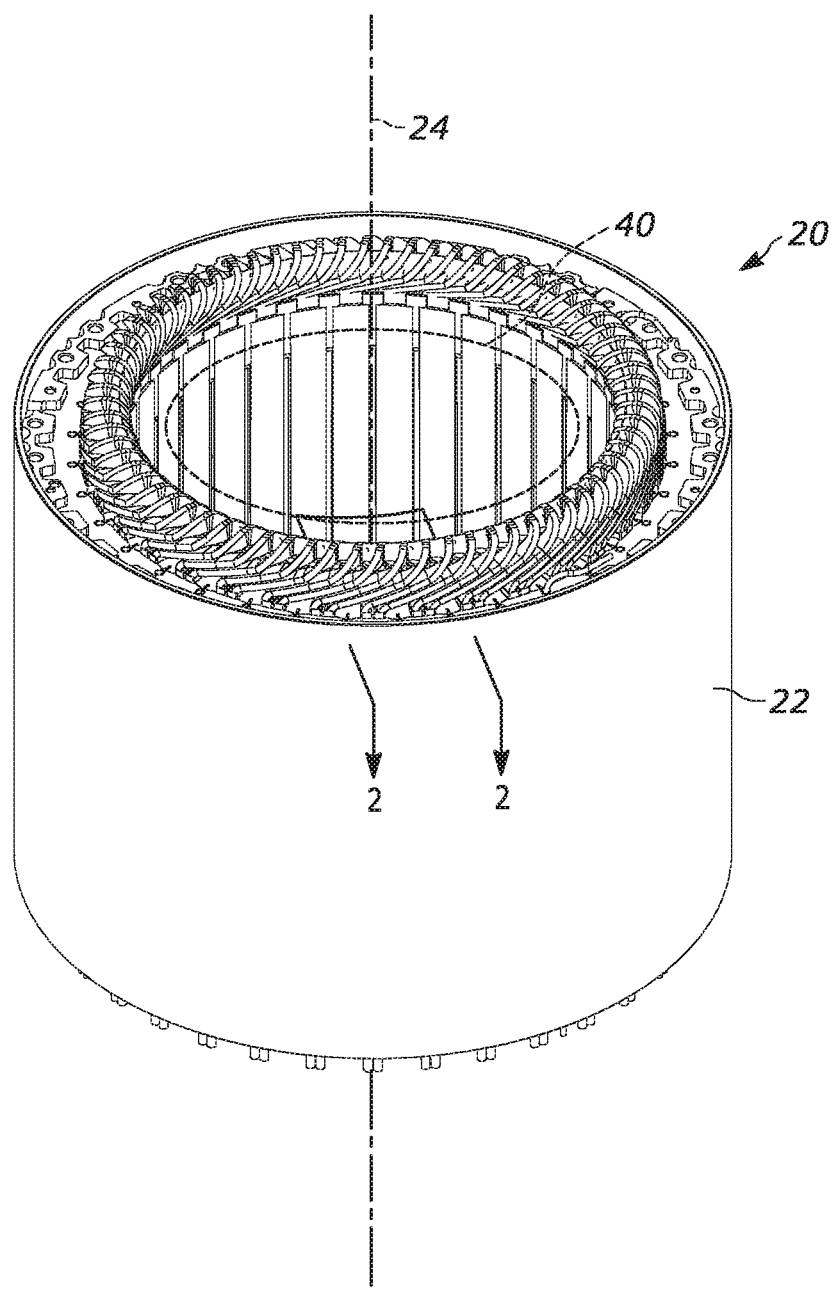
FIG. 1 is a front view of a rotary electric machine having an example stator winding coil.
Figure 2:
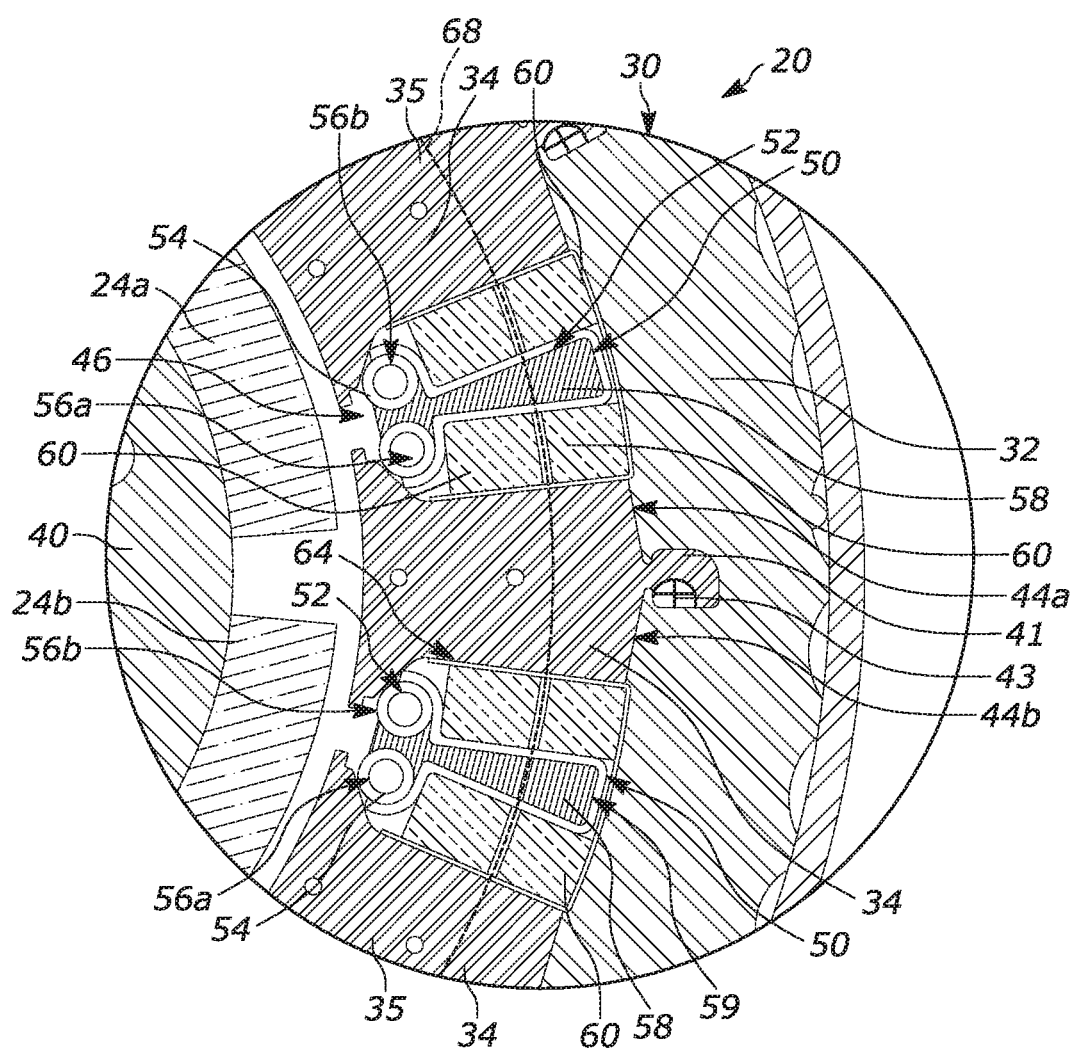
FIG. 2 is a section view of the rotary electric machine taken along lines 2-2 of FIG. 1 and including a rotor.

The present invention relates generally to rotary electric machines, and specifically to a winding configuration for rotary electric machines. Referring to FIGS. 1-2, one example rotary electric machine 20 includes a rotor assembly 40 rotatable within and relative to a stationary stator 30. A plurality of permanent magnets 24a, 24b are secured to the periphery of a back iron of the rotor assembly 40. The magnets 24a, 24b and back iron are rotatable together about a central axis 24 of the machine.

Figure 5:
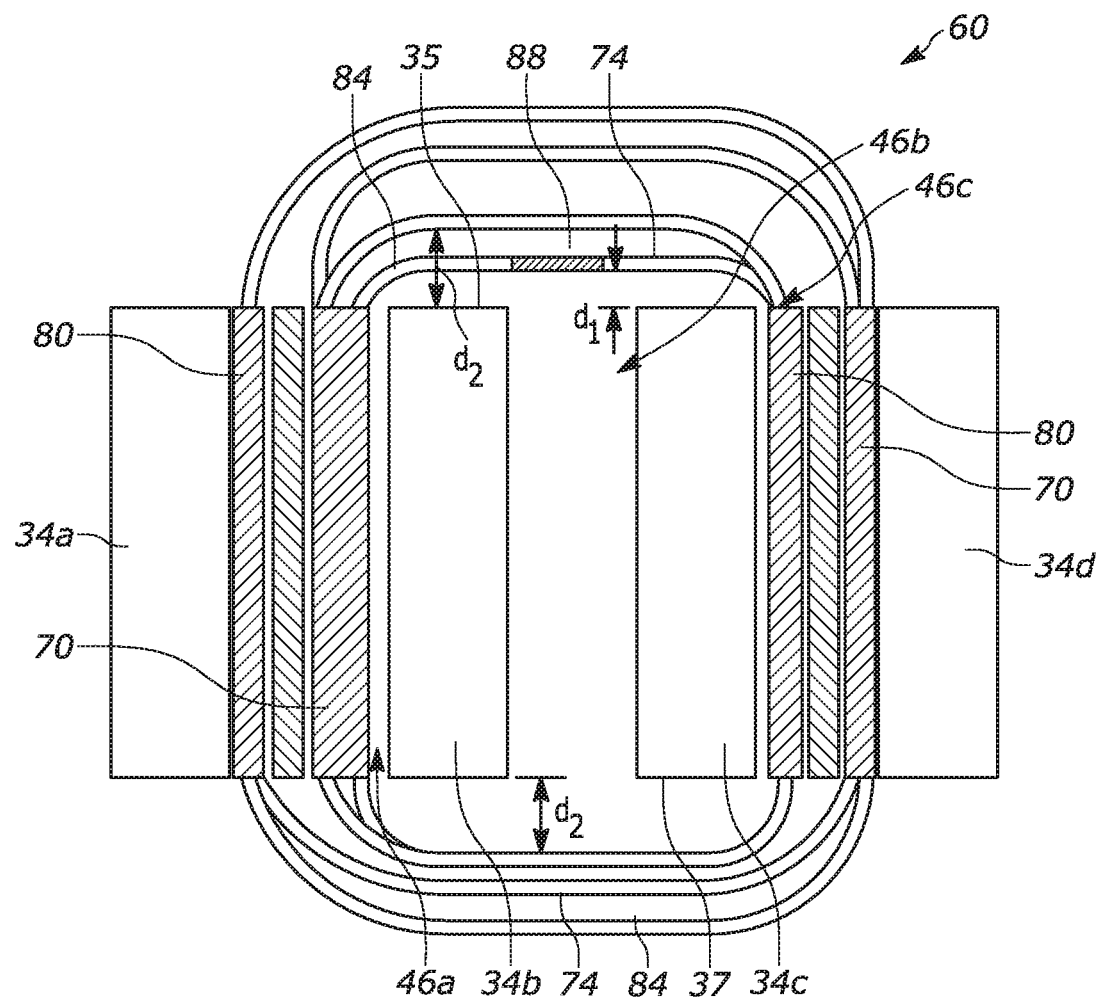
FIG. 5 is a schematic illustration of a winding coil extending around teeth of the stator.

The stator 30 extends about and along the axis 24. The stator 30 includes a ring-shaped core 32 formed from stacked laminations. Teeth 34 extend radially inward from the core 32 towards the axis 24. Each tooth 34 extends from a first axial end surface 35 to a second axial end surface 37 (see FIG. 5). The teeth 34 are arranged circumferentially about the axis 24 and extend substantially the entire length of the stator 30. The core 32 and teeth 34 can be formed from an electrically conductive material, such as laminated silicon steel.

Each tooth 34 includes a hook-shaped, resilient tab 41 for securing the tooth to the core 32. In particular, each tab 41 extends into an opening or slot in the core (not shown). A corresponding wedge 43 is inserted between a portion of the core 32 and the tab 41 to deflect the tab outward into engagement with the core in a manner that prevents relative axial and radial movement between the tooth 34 and the core. The wedge 43 urges the tab 41 radially outward to pull the tooth 34 radially outward into biased engagement with the core 32 along interface surfaces 44a, 44b on opposite sides of the tab. Each tooth 34 is secured to the core 32 in the same manner. Alternatively, the teeth 34 can be integrally formed with the core 32 (not shown). Regardless, the teeth 34 are circumferentially spaced apart from one another by slots 46.

An optional cooling device 52 can be provided in each slot 46. Each cooling device 52 includes a cooling bar 54 extending the entire axial length of the slot 46 between each pair of adjacent teeth 34. In other words, the cooling bars 54 are the same—or substantially the same—axial length as the teeth 34. Each cooling bar 54 includes a pair of fluid passageways 56a, 56b and a tab 58. It will be appreciated that the cooling bar 54 could include more or fewer fluid passageways. In any case, the tab 58 supports the fluid passageways 56a, 56b and extends radially outward towards the stator core 32.

Each cooling bar 54 is surrounded by a thermal interface material or layer 59 formed from, for example, a silicon-based material. In operation, a cooling fluid flows in one direction through the fluid passageways 56a and in the opposite direction through the fluid passageway 56b to help remove heat from the winding coils 60. A more detailed description of the cooling device 52 can be found in U.S. Publication No. 2017/0194838, the entirety of which is incorporated by reference herein.

Winding coils 40 formed from one or more winding turns of electrically conductive material such as copper, are wound around the teeth 34 and pass through the slots 46 on opposite sides of the cooling devices 52 (when present). In one example, the winding coils 60 are wound in a 3-phase configuration such that a portion of the winding coils are in phase A, a portion of the winding coils are in phase B, and a portion of the winding coils are in phase C. Each phase receives the same or substantially the same amount of current. Other phase configurations are contemplated. Multiple winding coils 60 can be connected in series and/or parallel and still receive the same amount of current. In a 3-phase configuration, phases can be connected in either a wye or delta configuration.

Figure 3:
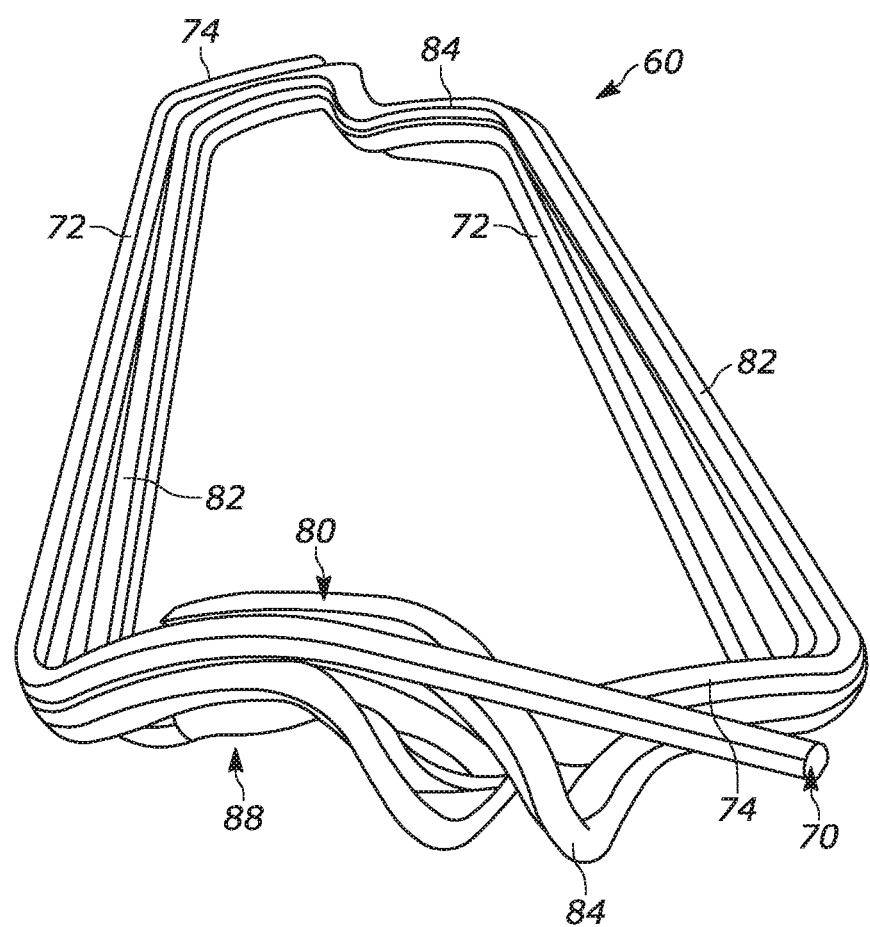
FIG. 3 is a front view of one of the winding coils of FIG. 1.

The winding coils 60 are made from rectangular wire formed into a diamond shape as shown in FIG. 3. Each winding coil 60 includes a first portion 70 and a second portion 80 electrically connected together at a connection or joint 88. That said, the first and second portions 70, 80 can each constitute a form-wound diamond coil portion. In any case, the first and second portions 70, 80 can be physically connected to one another in an end-to-end manner by electrical splicing, which can be accomplished by, for example, a brazed connection, a welded connection, a solid state welded connection, a soldered connection, a crimped connection, a screw terminal and/or a spring terminal.

The first portion 70 includes straight sections 72 and end turns 74 connecting the straight sections. The second portion 80 includes straight sections 82 and end turns 84 connecting the straight sections. The straight sections 72, 82 extend generally parallel to one another through the slots 46, i.e., on opposing sides of one or more teeth 34. The end turns 74, 84 extend generally parallel to one another between slots 46, i.e., over one or more teeth 34.

The winding coils 60 can be wound onto the stator 30 in any number of known manners, e.g., concentrated wound, distributed wound or hairpin wound. As shown, the winding coils 60 are formed from rectangular wire bent into a diamond shape and distributed wound around two teeth 34 and, thus, the winding coils span three slots 46 (identified at 46a, 46b, and 46c for clarity). Extending the winding coils 60 around more or fewer teeth 34 is contemplated.

The winding coils 60 are oriented in the slot 46 such that in cross-section the length (the longer dimension) extends generally circumferentially about the axis 24. The width (the smaller dimension) extends radially towards the axis 24. Multiple winding coils 60 in the same slot 46 are arranged abutting or adjacent one another in the radial direction and abutting or adjacent the associated tooth or teeth 34.

The first and second portions 70, 80 are wound around the teeth 34 such that the straight sections 72 and 82 form respective wire groups or bundles 76 and 86, respectively, within the slots 46. The example winding coils 60 shown includes six turns each of the first and second portions 70, 80 and, thus, the bundles 76, 86 in this example are divided into groups of three turns. Consequently, for each winding coil 60 a wire bundle 76 of three straight sections 72 and a wire bundle 86 of three straight sections 82 are provided in the first slot 46a. Similarly, a wire bundle 76 of three straight sections 72 and a wire bundle 86 of three straight sections 82 are provided in the third slot 46c.

The straight sections 72 within each wire bundle 76 are stacked in a column in the radial direction. The straight sections 82 within each wire bundle 86 are stacked in a column in the radial direction. The wire bundles 76, 86 within the first slot 46a are positioned on opposite sides of the associated cooling device 52 in the circumferential direction. The wire bundles 76, 86 within the third slot 46c are positioned on opposite sides of the associated cooling device 52 in the circumferential direction.

The wire bundles 76, 86 can be physically separated from the cooling devices 52 by the thermal interface material 59. The winding coils 60 can be electrically insulated from the teeth 34 and stator core 32 by slot liners 64 formed from, for example, polyimide tape or nomex paper, which add to the electrical insulation on the wires. Consequently, each wire bundle 76, 86 in each slot 46 is circumferentially sandwiched between the thermal interface material 59 and the slot liner 64.

Figure 6:
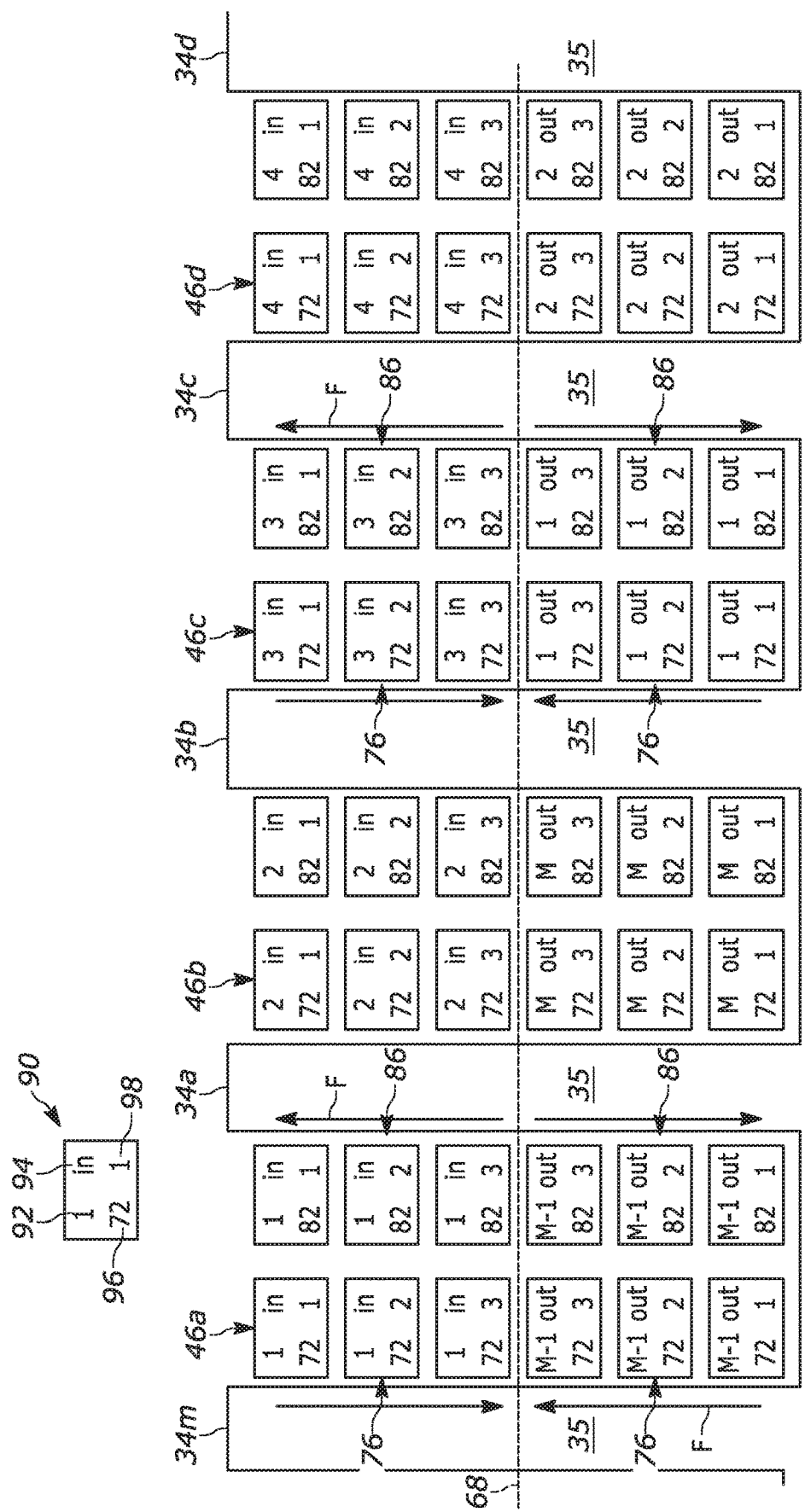
FIG. 6 is a schematic illustration of another example winding coil configuration.

It will be appreciated, however, that the cooling device 52 can be omitted (see FIG. 6) in which case the wire bundles 76, 86 are still provided on opposite circumferential sides of the slot 46. The wire bundles 76, 86 in this construction can abut one another or be spaced circumferentially from one another.

When another winding coil 60 is provided in the same slot 46, the bundles 76 in the same slot are stacked in the radial direction. Bundles 86 of different winding coils 60 within the same slot 46 are also stacked radially. A circumferential centerline or dividing line 68 extends through all the teeth 34 and between the bundles 76, 86 associated with one winding coil 60 and the bundles associated with another winding coil in the same slot 46. The dividing line 68 also extends radially between the bundles 76 of a winding coil 60 in one slot 46 and the bundle 76 of the same winding coil in another slot. The same is true of the bundles 86 of the same winding coil 60.

Figure 4:
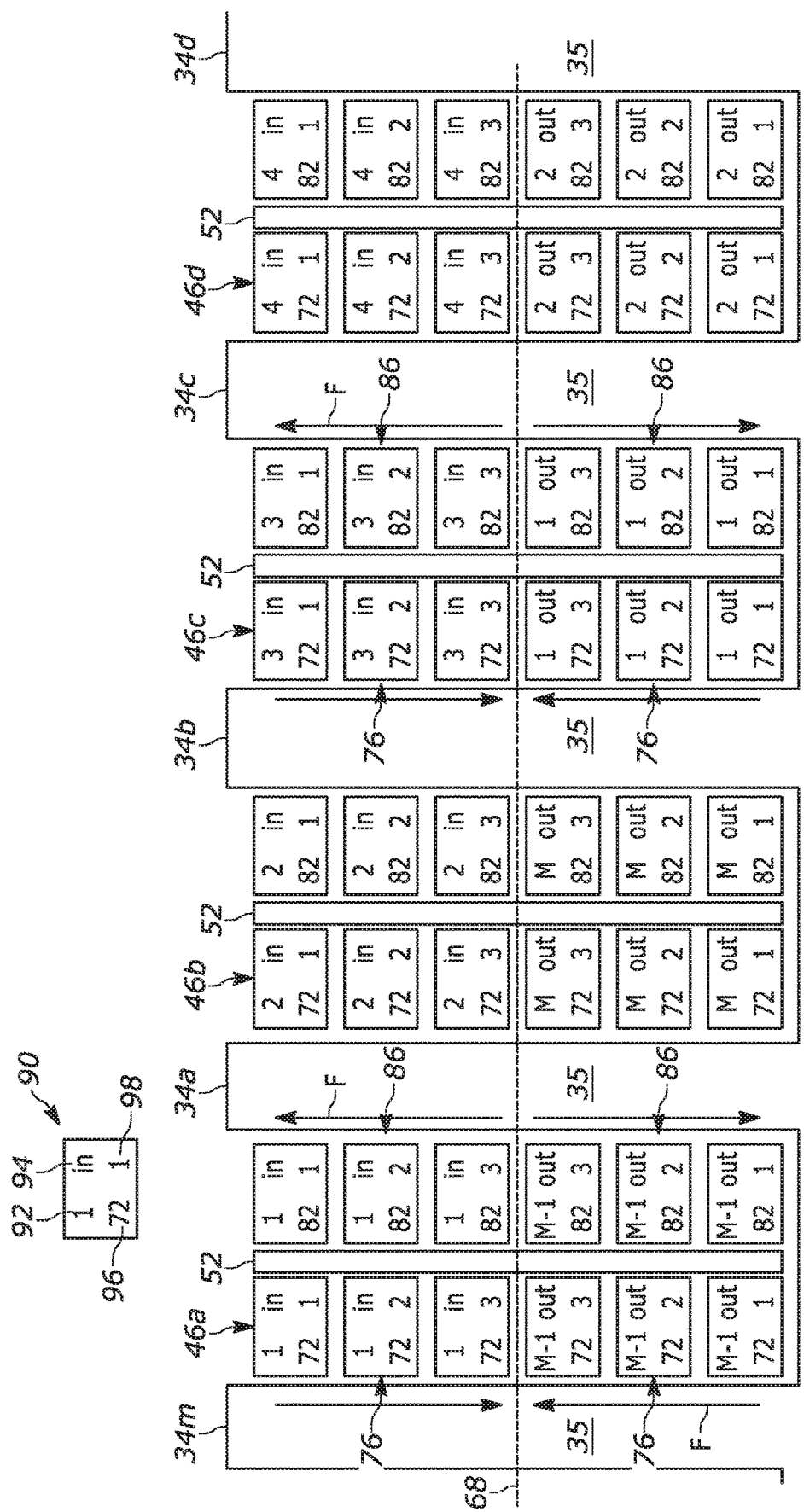
FIG. 4 is a schematic illustration of an example winding coil configuration for the stator.

FIG. 4 illustrates one example winding configuration of the winding coils 60 around the teeth 34. Although four teeth 34 are shown it will be appreciated that this winding configuration is the same for the remaining teeth in the stator 30. To this end, the winding configuration is applicable to a stator 30 having M number of slots 46 and double-layer winding coils. The teeth 34 and slots 46 are given the suffix "a", "b", "c" . . . "M" to refer to the first tooth, second tooth, M$^{th}$ tooth, etc. for purposes of clarity.

A legend 90 is provided for facilitating understanding of the wiring configuration. Reference number 92 indicates the winding coil number, e.g., 1$^{st}$, 2$^{nd}$, 3$^{rd}$ . . . M$^{th}$. Reference number 94 indicates the direction of current flow through the wire, with "in" referring to a direction flowing away from the axial end surface 35 (towards the axial end surface 37) and "out" referring to a direction flowing towards the axial end surface 35 (away from the axial end surface 37). Reference number 96 indicates the straight section 72 or 82 of the respective portion 70 or 80. Reference number 98 indicates the turn number of the particular winding portion 70, 80—the 1$^{st}$, 2$^{nd}$ or 3$^{rd}$ in the example shown.

As noted, each of the portions 70, 80 includes six turns that span three slots 46a, 46b, 46c and, thus, each portion 70, 80 loops around the first and second teeth 34a, 34b. Each slot 46a, 46c therefore receives a total of twelve straight sections 72, 82 of the first winding. Alternatively, each straight section 72, 82 shown could represent multiple conductors, e.g., two in-hand, connected electrically in parallel at the end of the winding coil 60. Regardless, although the following description relates to the first winding coil 60 it will be appreciated that subsequent winding coils are wound around the corresponding teeth 34 in a similar manner.

The first winding coil enters the top (the radially innermost portion) of the first slot 46a and returns from the bottom (the radially outermost portion) of the third slot 46c via one of the end turns 74. Subsequent turns in the first winding coil 60 likewise extend between the first and third slots 46a, 46c. Successive straight sections 72 in the first slot 46a are positioned radially outward of the previous straight section 72. Successive straight sections 72 in the third slot 46c are positioned radially inward of the previous straight section 72. In other words, the first portion 70 spirals incrementally towards the dividing line 68.

Successive straight sections 82 in the first slot 46a are positioned radially inward of the previous straight section 82. Successive straight sections 82 in the third slot 46c are positioned radially outward of the previous straight section 82. In other words, the second portion 80 spirals incrementally away from the dividing line 68. Consequently, current flows (indicated by the arrow F) through the first portion 70 towards the dividing line 68 in both slots 46a, 46c. In other words, as the current flows into and out of the slots 46 its radial position within the slots is also changing for both portions 70, 80.

On the other hand, current flows F through the second portion 80 away from the dividing line 68 in both slots 46a, 46c while flowing into and out of the slot. That said, within the same winding coil 60 current flow F is in opposite radial directions through the bundles 76, 86 in the same slot 46. It will be appreciated that the portions 70, 80 can be wound such that the current flow F is opposite the directions shown in FIG. 4.

Referring back to FIG. 5, the joint 88 between the first and second winding portions 70, 80 occurs in the transition between the third turn of the first portion 70 exiting the third slot 46c and the third turn of the second portion 80 entering the first slot 46a. Consequently, the joint 88 interconnects the first and second portions 70, 80. The joint 88 is located outside the slots 46 and adjacent the end turns 74, 84. Advantageously, the axial distance $d_1$ between the joint 88 and the first axial end surfaces 35 of the teeth 34 is less than the axial distance $d_2$ between any of the other end turns 74, 84 and either axial end surface 35, 37. In other words, the joint 88 is closer to the axial end surface 35 than the other ends turns 74, 84 and therefore fits under or between all the end turns. That said, the joint 88 is positioned axially between the end turns 74, 84 extending over the axial end surface 35 and the end turns extending over the axial end surface 37. This allows the end turns 74, 84 forming the joint 88 to have a shorter distance and less electrical resistance than the other end turns.

It will be appreciated that bundles 76, 86 associated with another winding coil 60 within the same slot 46 will be configured such that current flows F in the opposite radial direction for corresponding or associated bundles. For example, the bundle 76 in the M−1 winding coil in the first slot 46a has a current flow F towards the dividing line 68. The bundle 86 in the M−1 winding coil in the first slot 46a has a current flow F away from the dividing line 68. The bundle 76 in the third winding coil in the third slot 46c has a current flow F towards the dividing line 68. The bundle 86 in the third winding coil in the third slot 46c has a current flow F away from the dividing line 68.

Figure 7:
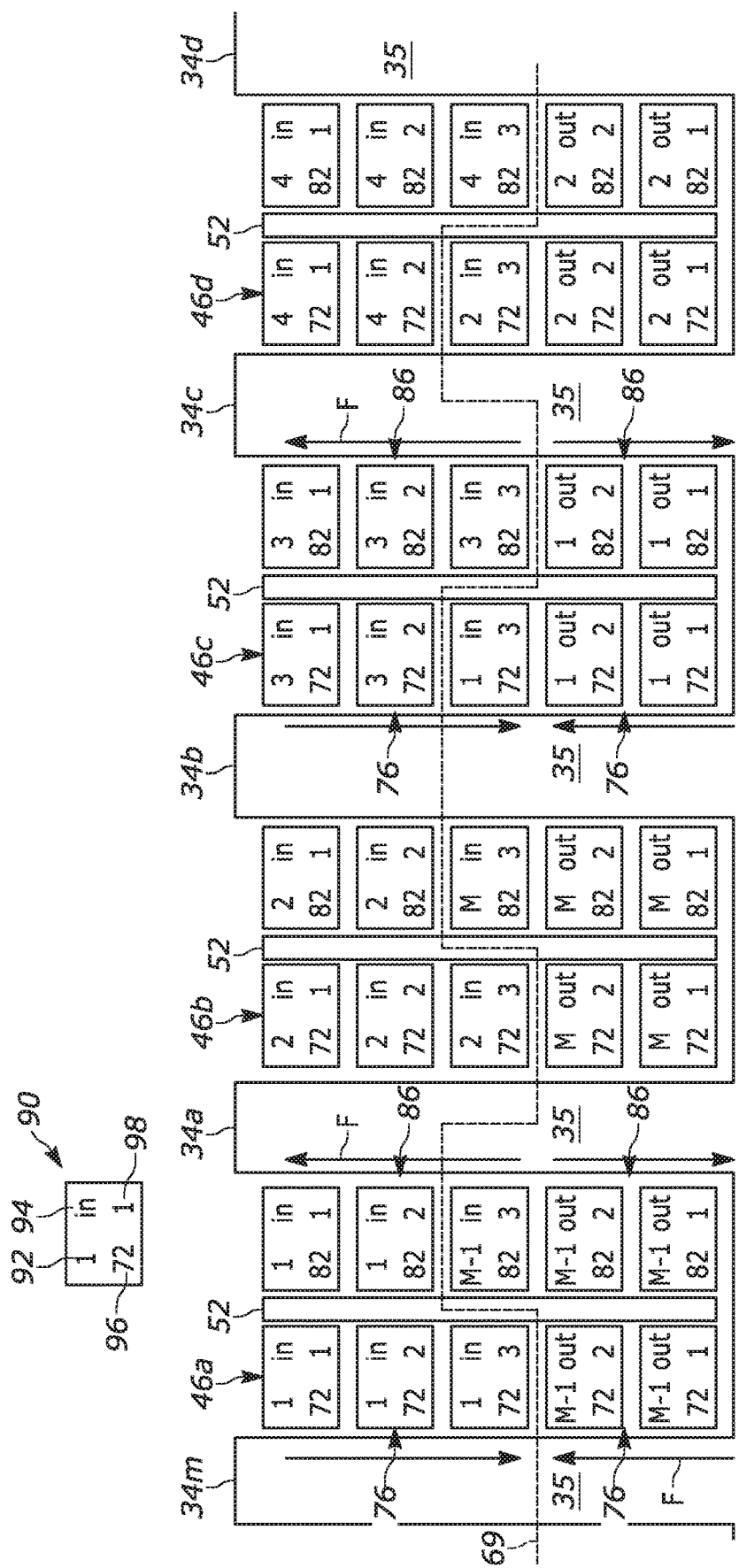
FIG. 7 is a schematic illustration of another example winding coil configuration.

Another example winding configuration is shown in FIG. 7. As shown, each winding coil 60 has an odd number of turns, namely, five turns. In this construction, the number of slots 46 divided by the coil span (in integer number of slots) is an even number. Each slot 46 receives ten straight sections 72, 82 from two different winding coils 60 spanning two teeth 34. The first winding coil 60 enters the top of the first slot 46a and returns from the bottom of the third slot 46c.

In contrast to the winding configuration in FIG. 4, in FIG. 7 one of the bundles 76 or 86 in each winding coil 60 has only two turns. As shown, the bundles 76 in the third, fourth, M−1, and M$^{th}$ winding coil 60 have two turns. The bundles 86 in the first and second winding coils 60 have two turns. The remaining bundles 76 or 86 in each winding coil 60 have three turns. The straight portions 72, 82 in each winding coil 60 are therefore asymmetrically stacked or arranged on each side of the cooling device 52.

More specific to the example shown, the first winding coil 60 bundle 76 has three turns while the M−1 winding coil bundle 76 has two turns. Similarly, the first winding coil 60 bundle 86 has two turns while the M−1 winding coil bundle 86 has three turns. This winding coil 60 configuration can be generalized to any number of slots 46 and coil span as long as the number of slots divided by the coil span is an even number. If this condition is met, this winding configuration allows an odd number of turns for each coil.

In FIG. 7, the joint 88 between the first and second winding portions 70, 80 occurs in the transition between the third turn of the first portion 70 exiting the third slot 46c and the third turn of the second portion 80 entering the first slot 46a. The joint 88 between bundles 76, 86 in each coil 60 the joint 88 fits under or between all the end turns 74, 84, which allows the end turns 74, 84 forming the joint 88 to have a shorter distance and less electrical resistance than the other end turns. In other words, the axial distance $d_1$ between the end turn 74, 84 having joint 88 and the first axial end surfaces 35 of the respective teeth 34 is less than the axial distance $d_2$ between any of the other end turns 74, 84 and either axial end surface 35, 37. That said, the joint 88 is positioned axially between the end turns 74, 84 extending over the axial end surface 35 and the end turns extending over the axial end surface 37.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A rotary electric machine comprising:
   a stator extending along an axis and having teeth arranged about the axis, the teeth being circumferentially spaced apart by slots; and
   winding coils extending around the teeth and through the slots, the winding coils being electrically connected to one another to form phases, at least one of the winding coils having:
      a first portion extending through first and second slots of the slots and including:
         first end turns extending between the first and second slots over an axial end surface of the teeth, and
         a first joint end turn contiguous with the first end turns; and
      a second portion extending through the first and second slots and including:
         second end turns extending between the first and second slots over the axial end surface of the teeth, and
         a second joint end turn contiguous with the second end turns;
      the first joint end turn and the second joint end turn being connected in series at a joint;
      wherein the first joint end turn and the second joint end turn are spaced an axial distance closer to the axial end surface than either the first or second end turns.

2. The rotary electric machine recited in claim 1, wherein in the first slot successive turns of the first portion are wound in a first radial direction and successive turns of the second portion are wound in a second radial direction opposite the first radial direction.

3. The rotary electric machine recited in claim 2, wherein in the second slot successive turns of the first portion are wound in the second radial direction and successive turns of the second portion are wound in the first radial direction.

4. The rotary electric machine recited in claim 1, wherein the winding coils are form-wound diamond coils.

5. The rotary electric machine recited in claim 1, further comprising cooling devices positioned in the first and second slots, each cooling device being positioned circumferentially between the first and second portions of the winding coil of the respective first and second slot.

6. The rotary electric machine recited in claim 1, wherein a dividing line extends circumferentially about the axis and through the first and second slots, the first and second portions in the first slot being positioned on an opposite side of the dividing line from the first and second portions in the second slot.

7. The rotary electric machine recited in claim 1, wherein the first and second portions have the same number of turns.

8. The rotary electric machine recited in claim 1, wherein the first and second portions have a different number of turns.

9. The rotary electric machine recited in claim 1, wherein each of the first and second portions has an even number of turns.

10. The rotary electric machine recited in claim 1, wherein each of the first and second portions has an odd number of turns.

11. The rotary electric machine recited in claim 1, wherein turns of the first portion are stacked radially in the first slot and the second slot.

12. The rotary electric machine recited in claim 11, wherein successive turns of the first portion in the first slot are wound in a first radial direction and successive turns of the first portion in the second slot are wound in a second radial direction opposite the first radial direction.

13. The rotary electric machine recited in claim 12, wherein turns of the second portion are stacked radially in the first slot and the second slot.

14. The rotary electric machine recited in claim 13, wherein successive turns of the second portion in the first slot are wound in the second radial direction and successive turns of the second portion in the second slot are wound in the first radial direction.

15. The rotary electric machine recited in claim 1, further comprising a cooling device positioned in each of the first and second slots and located circumferentially between the first portion and the second portion.

16. A winding coil for a rotary electric machine having a stator extending along an axis and having teeth arranged about the axis, the teeth being circumferentially spaced apart by slots, the winding coil comprising:
   a first portion for extending through first and second slots of the slots and including:
      first end turns extending between the first and second slots over an axial end surface of the teeth, and
      a first joint end turn contiguous with the first end turns; and
   a second portion for extending through the first and second slots and including:
      second end turns extending between the first and second slots over the axial end surface of the teeth, and
      a second joint end turn contiguous with the second end turns;
   the first joint end turn and the second joint end turn being connected in series at a joint;
   wherein the first joint end turn and the second joint end turn are spaced an axial distance closer to the axial end surface than either the first or second end turns.

17. The winding coil recited in claim 16, wherein the joint is positioned axially between the first and second end turns at a first end of the machine and the first and second end turns at a second end of the machine opposite the first end.

18. A rotary electric machine comprising:
   a stator extending along an axis and having teeth arranged about the axis, the teeth being circumferentially spaced apart by slots; and
   first and second winding coils extending around the teeth and through the slots, the first and second winding coils being electrically connected to one another to form phases, the first and second winding coils extending through first and second slots of the slots such that successive turns of the first winding coil in the first slot are wound in a first radial direction and successive turns of the second winding coil in the first slot are wound in a second radial direction opposite the first radial direction.

19. A rotary electric machine comprising:
   a stator extending along an axis and having teeth arranged about the axis, the teeth being circumferentially spaced apart by slots; and winding coils extending around the teeth and through the slots, the winding coils being electrically connected to one another to form phases, at least one of the winding coils having:
- a first portion extending through first and second slots of the slots and including first end turns extending between the first and second slots over an axial end surface of the teeth; and
- a second portion extending through the first and second slots and including second end turns extending between the first and second slots over the axial end surface of the teeth, the first and second portions being connected in series, wherein in the first slot successive turns of the first portion are wound in a first radial direction and successive turns of the second portion are wound in a second radial direction opposite the first radial direction.

20. The rotary electric machine recited in claim 19, wherein the first and second portions are formed from rectangular wire.

* * * * *